United States Patent [19]
Schmid

[11] 3,933,727
[45] Jan. 20, 1976

[54] METHOD OF PRODUCING POLYURETHANE-BASED CORES AND MOULDS ACCORDING TO THE SO-CALLED COLD-BOX PROCEDURE

[75] Inventor: Hermann Pius Schmid, Karlskoga, Sweden

[73] Assignee: AB Bofors, Bofors, Sweden

[22] Filed: Sept. 13, 1973

[21] Appl. No.: 397,186

[30] Foreign Application Priority Data
Sept. 26, 1972 Sweden............................ 12377/72

[52] U.S. Cl.... 260/37 N; 260/47 CB; 260/77.5 AM; 260/77.5 AQ
[51] Int. Cl.²........................................ C08G 18/28
[58] Field of Search..... 260/37 N, 47 CB, 77.5 AM, 260/77.5 AQ

[56] References Cited
UNITED STATES PATENTS

| | | | |
|---|---|---|---|
| 3,441,523 | 4/1969 | Dwyer et al. | 260/2.5 |
| 3,450,653 | 6/1969 | McClellan | 260/18 |
| 3,538,040 | 11/1970 | Grazen | 260/37 |
| 3,725,355 | 4/1973 | Parrish et al. | 260/77.5 AP |
| 3,745,139 | 7/1973 | Kachur et al. | 260/38 |

*Primary Examiner*—Lee: Lester L.
*Attorney, Agent, or Firm*—Oblon, Fisher, Spivak, McClelland & Maier

[57] ABSTRACT

A method is provided for producing polyurethane-based cores and moulds, using a mixture of particle-formed material such as sand, a bonding agent containing a polyisocyanate compund and a polyhydroxy compound and if necessary a solvent, after which the mixture is shaped to a desired form and hardened by means of a catalyst, wherein the polyhydroxyl compound consists of one or more aliphatic or aromatic polyethers, together with a hydroxyl compound for initiating the catalyzation, which hydroxy compound consists of an aromatic compound with at least two OH groups which directly, or via a methalene group, are linked to a carbon atom in the aromatic nucleus.

3 Claims, No Drawings

METHOD OF PRODUCING POLYURETHANE-BASED CORES AND MOULDS ACCORDING TO THE SO-CALLED COLD-BOX PROCEDURE

The present invention relates to a method of producing polyurethane-based cores and moulds, according to the so-called "cold-box" procedure, and a bonding agent for carrying out the method.

When producing cores and moulds, the so-called "cold-box" method has become more and more widely used. This method, which is described in inter alia the Swedish laid-out publications Nos. 314.477 and 343.310 has the great advantage as compared with earlier methods that it does not require any heating of the moulding sand for hardening. The method is briefly based on the preparation of a mixture of particle-formed material, particularly sand, and a bonding agent, after which the mixture is given the form desired and, finally is, hardened by means of a catalyst. The bonding agents previously used according to these references have been based upon solutions of polyisocyanate compounds and phenolic resins, synthetic or native drying oils.

However, cores made with these known bonding agents have a number of drawbacks. The cores and moulds made by means of the known bonding agents cannot be adapted to the conditions prevailing during every special casting of metal. This has the consequence that many defects arise, resulting in expensive finishing operations or rejections of the castings. Thus, it may be mentioned that cores made according to the previously described methods are sensitive to thermal shocks, and thus are liable to cause cracking when casting metals. A characteristic defect when using phenolic resins is the formation of so-called "scabs". Further, the disintegration of the cores when casting light metal is not acceptable.

The procedure is based upon a polyaddition reaction between the NCO groups in the polyisocyanates and active hydrogens in the polyhydroxy compounds. The polyaddition reaction starts even in a neutral environment, and even at room temperature it is possible to reach a final stage of the hardening process.

In order to accelerate the hardening process, metallorganic compounds, metal salts or solutions thereof, or tertiary amines are generally used. By choosing an appropriate concentration of these catalysts, the processing time and the hardening time can be varied within fixed limits. For practical, efficient application of the procedure, however, this is not the ideal way of proceeding, since low concentrations of a catalyst will give a long hardening time. High concentrations of the catalyst will shorten the processing time available.

It has now been possible to eliminate these drawbacks of the methods previously used, to a great extent, by using the procedure according to the invention, which is mainly characterized in that the polyhydroxy compound consists of one or more aliphatic or aromatic polyethers, together with a hydroxy compound for initiating the catalyzation, which hydroxy compound consists of an aromatic compound with at least 2 OH groups, which directly or via a methylene group are linked to a carbon atom in the aromatic nucleus.

The invention also relates to a bonding agent for carrying out this method, and the bonding agent, which contains a polyisocyanate compound and a polyhydroxy compound and if necessary a solvent, is mainly characterized in that the polyhydroxy compound consists of one or more aliphatic or aromatic polyethers together with a hydroxy compound for initiating the catalyzation, which hydroxy compound consists of an aromatic compound with at least 2 OH groups, which are linked directly or via a methylene group to a carbon atom in the aromatic nucleus.

The invention makes it possible to manufacture cores and moulds continuosly in large series. The raw strength, i.e. the strength directly after the manufacture, is so high that there are no risks involved in handling the cores and moulds.

With an appropriate composition of the bonding agent, the cores and moulds obtained according to the invention can be used for casting of cast iron, steel and light metal.

The moulding sands made according to the invention are characterized by good thermal shock resistance and excellent disintegration after the casting of the metal. These favourable effects can be achieved only through the great variations of the composition of the bonding agent which are possible according to the invention. Thus, the relation between the aliphatic and aromatic components may be varied within wide limits. This is not possible with the bonding agent systems previously known and described.

The moulding sands are prepared by mixing dry foundry sand, e.g. quartz or olivine sand with a polyisocyanate compound. The polyisocyanate compound may be added with or without a solvent. An inert solvent is added in order to keep the viscosity of the mixture at an acceptable level. The mixing of the sand and polyisocyanate should appropriately take place in an atmosphere that is free from moisture, and at a temperature of 20°–25°C. After careful mixing of the sand with polyisocyanate, the polyhydroxy compounds are added. Moulding sands made in this way usually have a processing time of several hours. The moulding sand is transported by means of compressed air or in a mechanical way to the core mould, in which it is compressed. Directly in connection with this, or simultaneously, the catalyst is added appropriately in the form of a gaseous tertiary amine. This gives a spontaneous hardening of the moulding sand, and the core may thereafter be removed directly from the mould. The strength of these cores is so great that no extra reinforcement is necessary. The cores and moulds may contain some solvent. This may be removed with compressed air. In certain cases the use of hot compressed air may be advantageous. In this way, any possible excess of tertiary amines is removed together with the solvent residue. The cores made in this way may be used directly for casting of metal. It will not be necessary to keep any stores of cores, which is a considerable economic advantage. For special metal casting, however, it is necessary to treat the surfaces of the cores and moulds with so-called "blacking agents". These are well-known compositions in foundries, and consist of graphite and/or metal oxides with organic or inorganic bonding agents.

However, the manufacture of the moulding sand may also be carried out in such a way that two separate mixtures of sand are prepared. One of these mixtures of sand then contains the polyhydroxy compound to which the catalyst has been added in the form of a tertiary amine or a metallorganic compound, while the other mixture contains sand and a polyisocyanate compound. Immediately before or simultaneously with the application in the moulds, the two moulding sands are mixed together, at a high velocity. The cores will then harden immediately. Thereafter the cores may be removed from the moulds, and a subsequent gasing operation is thereby eliminated. (See Examples 10, 11, 12).

According to the invention, the moulding sands substantially consist of sand to which has been added up to 20 per cent by weight of bonding agent, as calculated on the quantity of sand. However, the quantity of bonding agent should preferably be between 0.5 and 3.5 per cent by weight, as calculated on the quantity of sand.

When applying the method according to the present invention, uniform polyisocyanates or mixtures of these may be used. The polyisocyanates should have at least two —NCO groups, but polyisocyanates with up to six -NCO groups may be used. The polyisocyanates may have aliphatic, cyclo-aliphatic, araliphatic, aromatic or heterocyclic molecular structure. As examples of polyisocyanates to be used, the following may be mentioned:

2,4-toluene diisocyanate or 2,6-toluene diisocyanate or their isomeric mixtures, diphenyl methane-4,4-diisocyanate, diphenyl-dimethyl-methane-4,4-diisocyanate, tri-phenyl-4,4,4-triisocyanate, phenylene-diisocyanate-1,4,2,2-6,6-tetramethyl-diphenyl-methane-4,4-diisocyanate, diphenyl-4,4-diisocyanate, diphenyl-ether-4,4-diisocyanate or their halogen substituted derivatives, 2,6-diisopropylene-1,3-diisocyanate, m-xylene-diisocyanate, p-xylene-diisocyanate, tetra-methyl-p-xylene diisocyanate, dimertoluene-2,4-diisocyanate, hexane-1,6-diisocyanate, cyclo-hexane-1,4-diisocyanate, 1,2,3,4,5,6-hexanhydro-diphenyl-methane-4,4-diisocyanate, naphthalene-1,5-diisocyanate.

Instead of these above-mentioned polyisocyanates, also a great number of addition products with —NCO end groups may be used. These addition products are prepared in such a way that a polyhydroxy compound is reacted with polyisocyanate in such a relation that at least two NCO-groups per molecule in excess are obtained. In certain cases, the excess of NCO groups may be six per molecule.

The polyhydroxy compounds that can be used for the manufacture of moulding sands for foundries according to the invention may be summarized in the expression polyethers. These polyethers may be of such a nature that they are built up on an aliphatic or an aromatic molecular structure. The number of OH groups per molecule which are available for the reaction with the polyisocyanates may vary from two to six. As examples of such compounds may be mentioned compounds which are made with aliphatic diols, triols, tetrols, pentols and hexols and aliphatic diamines as initiators. These aliphatic polyols and diamines should appropriately have straight chains containing 2–6 carbon atoms. Through the addition of ethylene oxide, propylene oxide and tetrahydrofuran respectively to the initiators, two to six function products are obtained, with molecular weights varying from 100 to 10,000.

Examples of such products are:

Diols: Voranol P-2000 from Dow Chemicals, USA based upon propylene glycol and propylene oxide
Triols: Voranol CP-2700 from Dow Chemicals, USA
Voranol CP-3000 from Dow Chemicals, USA
Voranol CP-5000 from Dow Chemicals, USA based upon glycerol and propylene oxide
Tetrols: Pluracol PeP-450 from Wyandotte Chemicals, USA
Pluracol PeP-650 from Wyandotte Chemicals, USA based upon pentaerythrite and ethylene oxide
Tetrol on amine basis:
Quadrol from Wyandotte Chemicals, USA based upon ethylene diamine and ethylene oxide
Hexols on sorbitol basis:
Atlas-sorbitolether G-2410 from Atlas-Chemical Industries Inc. based upon sorbitol and propylene oxide.

The polyethers described above are aliphatic compounds. However, for the preparation of moulding sands according to the invention, polyethers on an aromatic basis may also be advantageously used. The ring structure may be a C-5 or C-6 ring structure. Examples of such compounds are the reaction products between ethylene oxide, propylene oxide and tetrahydrofuran and dihydroxy-diphenyl-propane, dihydroxy-diphenyl-methane, dihydroxy-diphenyl or dihydroxy-hydantoin.

These aromatic polyethers may be comprised in the following general formulae:

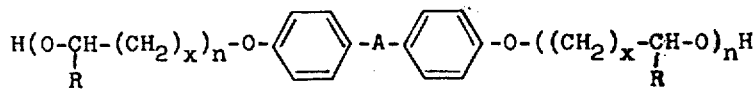

and

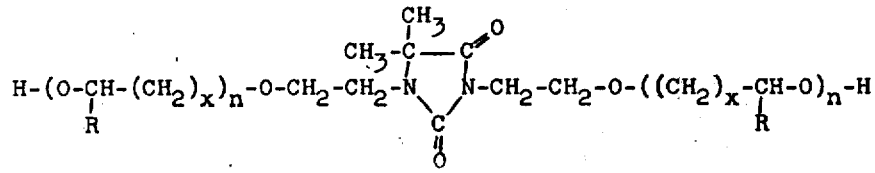

in which A designates a single bond

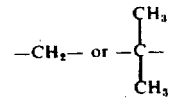

and $x = 1$ and $R = H$ or methyl, or
$x = 3$ and $R = H$,
and $n = 1$-5.

The molecular weight of these compounds is between 300 and 800. These polyhydroxy compounds described above react with polyisocyanates through polyaddition. However, the reaction velocity is not sufficient to give bonding agent compositions suitable for efficient, continuous manufacture of cores. A catalyzation according to ordinary methods is not possible. An essential point in the method according to the invention is therefore the addition of the hydroxy compounds initiating the catalyzation, which react very slowly with polyisocyanates, but spontaneously when they come into contact with gaseous or liquid tertiary amines. This group of compounds has an aromatic molecular sturcture. These compounds may also be built-up of one to six benzene rings, and the nuclei can then be linked directly to each other or separated through

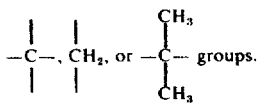

Moreover, these compounds must contain at least two OH groups per molecule. However, it is also possible to use compounds which contain two to six OH groups per molecule. An essential feature is that the OH groups must be linked directly or via a methylene group to a carbon atom in the nucleus.

Examples on such compounds are:

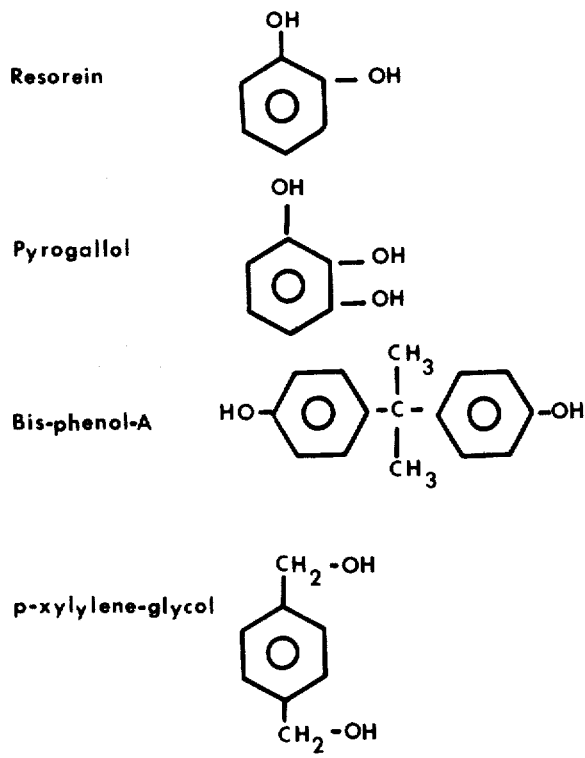

The hydrogen atoms in the ring systems may be partly or wholly substituted with e.g. halogen atoms or ester groups. These abovementioned compounds do not only have a catalyzing effect, but because of the presence of active hydrogen, they also participate in the poly-addition reaction with the polyisocyanates.

In order to obtain a rapid hardening of the moulding sands at the contact with the gaseous tertiary amines, a certain relation between polyether and the catalyzing OH compound is necessary. According to the invention, the content of the catalyzing OH compound is to be between 5 and 50 per cent by weight, preferably between 10 and 35 per cent by weight as calculated on the polyether.

These polyhydroxy compounds which may be used according to the invention may be water-free or may contain a certain amount of water. In normal cases, the water content is <0.1 per cent by weight, but polyethers with water contents of up to 10 per cent by weight as calculated on the amount of polyether may be used.

The polyhydroxy compounds which may be utilized according to the invention may be used free from solvent. In order to improve the solubility of the different components, and to keep the viscosity at an acceptable level, it is an advantage to use an addition of aliphatic, aromatic or cyclo-aliphatic and chlorinated hydrocarbons and/or esters. It is only the degree of toxicity of these solvents that determine their practical usefulness. Petroleum spirits and "Cellosolve acetate" ($CH_3$—$COO$—$C_2H_4$—$O$—$C_2H_5$) are examples of the most suitable types of solvents for the preparation of moulding sands for foundry purposes.

In order to obtain cores and moulds with acceptable mechanical properties, it is necessary to mix the polyisocyanates and the polyhydroxy compounds in a ratio which according to the invention should be $$\frac{NCO}{OH} = 0.8 - 3.0 \text{ particularly } 1.5 - 3.0.$$

The invention will be further illustrated in the following, nonlimiting examples.

EXAMPLE 1

In this example, as well as in the other examples, for the polyisocyanate compound, a mixture of raw diphenyl-methane-4,4-diisocyanate and petroleum spirits in the weight proportions of 9:1 has been used. This mixture has an amino equivalent of 153 and a content of active hydrolyzable chlorine of 652 ppm. The viscosity at 25°C according to Brookfield is 66 cP.

The polyhydroxy compound used is prepared by dissolving dihydroxydiphenyl-propane in Cellosolve acetate at 60°C, and to this solution an aliphatic polyether based on glycerol is added. This polyether is sold by Dow Chemicals, USA under the trade name Voranol CP-4711. The mixture obtained has the composition (per cent by weight):

| | |
|---|---|
| 35.0 % | dihydroxy-diphenyl-propane |
| 25.0 % | Cellosolve acetate |
| 40.0 % | Voranol CP-4711 |
| 100.0 % | |

This mixture has the following analysis data: OH number: 187; Viscosity 25°C (Brookfield) 1030 cP.

On the basis of these two components, cores are prepared in the following way:

A. 200 grams of olivine sand are mixed with 5 grams of the polyisocyanate compound for two minutes. Thereafter 5 grams of the polyhydroxy compound are added, and the mixing is continued for 2 minutes more. The ratio of NCO/OH in this mixture is 2:03. The sand mixture thus obtained, which has an available processing time of 4–5 hours, is thereafter formed into AFS tensile-strength test samples of the standard type, using the standardized procedure. The test samples obtained are thereafter hardened through treatment with triethyl amine. At the triethyl amine treatment an air current is bubbled through liquid triethyl amine, and thereafter through the test samples at a temperature of 20°–25°C for a time of 60 secs. The test sample hardened after being gased through with triethyl amine may be removed directly from the core box used, and its tensile strength is >30 kg/cm².

B. The above-mentioned example 1A is repeated, but using 3.7 grams of polyisocyanate compound and 5.0 grams of polyhydroxy compound, i.e. a NCO/OH ratio of 1.50. The test sample obtained has a tensile strength of approx. 20 kg/cm².

C. The above-mentioned example 1A is repeated, but using 2.46 grams of polyisocyanate compound and 5.0 grams of polyhydroxy compound, i.e. a NCO/OH ratio of 1.0. The test sample obtained has a tensile strength of approx. 15 kg/cm².

EXAMPLE 2

200 grams of olivine sand is mixed for 2 minutes with 5 grams of the polyisocyanate compound as used in Example 1. Thereafter 5 grams are added of a polyhydroxy compound consisting of

| 10 | per cent by weight of | Voranol CP-4711*) |
| 50 | " | Voranol NC-1874*) (aromatic polyether based on Bis-phenol-A) |
| 20 | " | dihydroxy-diphenyl propane |
| 20 | " | Cellosolve acetate |
| 100 | " | |

*)sold by Dow Chemicals, USA.

The sand mixtures obtained were formed into cores, and were hardened according to the procedure described in example 1.

The cores obtained have proved to be extremely appropriate for casting steel at temperatures of up to about 1650°C. Cores may be made of the sand mixture used in sizes of from 100 grams up to 200 – 300 kg, and may be used for casting of very complicated steel details. The knockout procedure after the casting is two to three times faster with these cores than with cores obtained with conventional bonding agents.

EXAMPLES 3 – 4

Example 2 is repeated, but using other polyhydroxy compounds, viz.:

a) a mixure of
| 20 | per cent by weight of | Resorcin |
| 55 | " | Voranol CP-4711 |
| 25 | " | Cellosolve acetate |
| 100 | " | | or
b) a mixture of
| 15 | per cent by weight of | pyrogallol |
| 60 | " | Voranol |
| 25 | " | Cellosolve acetate |
| 100 | " | |

The cores obtained have properties that are quite equivalent to those of the cores prepared according to Example 2.

| Example No. | Hydroxy compound for initiating catalyzation | | Polyether | | Solvent | |
|---|---|---|---|---|---|---|
| | Type | % | Type | % | Type | % |
| 5 | Dihydroxy-diphenyl propane | 35.0 | Voranol-P-2000 (diol) | 40.0 | Cellosolve acetate | 25.0 |
| 6 | " | 35.0 | Voranol-CP-3000 (triol) | 40.0 | " | 25.0 |
| 7 | " | 16.0 | Pluracol PeP-450 (tetrol) | 20.0 | " | 64.0 |
| 8 | " | 15.0 | Pluracol PeP-650 (tetrol) | 30.0 | " | 55.0 |
| 9 | " | 15.0 | Sorbitol-ether G-2410 (hexol) | 23.0 | " | 62.0 |

When using the compositions mentioned in examples 5– 9, cores are obtained which are quite equivalent to the cores obtained according to Example 2.

EXAMPLE 10

This example describes another suitable procedure for preparing cores by using the compositions described according to the invention. Dry foundry sand is then used, which is mixed with 1.5 % by weight of the isocyanate component as prepared according to Example 1. This mixture is stored under a moisture-free atmosphere. Another quantity of sand is mixed with 1.5 % by weight of the following polyhydroxy composition:

| 10.0 % | Voranol CP-4711 |
| 50.0 % | Voranol NC-1874 |
| 20.0 % | dihydroxy-diphenyl propane |
| 19.0 % | Cellosolve acetate |
| 1.0 % | triethyl amine |
| 100.0 % | |

Also this mixture is stored under a moisture-free atmosphere. When properly stored, both of these sand mixtures have an unlimited storage stability. When manufacturing cores, the two sand compositions are mixed with a ratio of 1:1 under vigorous stirring, and applied rapidly by means of compressed air in the core box. The core is then hardened spontaneously, and may thereafter be removed from the core box.

EXAMPLE 11

The procedure according to Example 10 is repeated. However, the following polyhydroxy composition is used:

| 10.0% | Voranol CP-4711 |
| 50.0% | Voranol NC-1874 |
| 20.0% | dihydroxy-diphenyl propane |
| 19.0% | Cellosolve acetate |

-continued

| | |
|---|---|
| 1.0% | organic tin compound(C₄H₉)₂—SN(O—CO.C₁₀H₂₀—CH₃)₂ |
| 100.0% | |

EXAMPLE 12

The procedure according to Example 10 is repeated. However, the following polyhydroxy composition is used:

| | |
|---|---|
| 10.0 % | Voranol CP-4711 |
| 50.0 % | Voranol NC-1874 |
| 20.0 % | dihydroxy-diphenyl propane |
| 19.0 % | Cellosolve acetate |
| 1.0 % | 1.2-dimethyl-imidazole |
| 100.0 % | |

The cores prepared according to Examples 10, 11 and 12 have the same properties as those described in Examples 1 and 2. These Examples, show that the bonding agent composition fulfils its function regardless of the application procedure used when manufacturing the cores. Further, Examples 10, 11 and 12 show that the choice of tertiary amine or metal-organic compound is of minor significance for the bonding agent.

I claim:

1. In a method for producing "cold-box" polyurethane cores and molds which are useful for the casting of iron, steel or light metals, the improvement which comprises: admixing sand with a bonding agent, wherein said bonding agent comprises the combination of a polyisocyanate with at least two and up to six isocyanate groups per molecule and a polyhydroxy compound, wherein said polyhydroxy compound consists of at least one aliphatic or aromatic polyether-polyol in combination with 5 – 50 percent by weight as calculated on the amount of polyether of an aromatic hydroxy compound for initiating the catalyzation, said hydroxy compound having at least 2 OH-groups which directly or via one methylene group are linked to a carbon atom in the aromatic nucleus, said polyether-polyol consisting of one or more polyadducts of ethylene oxide, propylene oxide or tetrahydrofuran, respectively, to an aliphatic diamine or an aliphatic or aromatic polyol with 2 – 6 hydroxy groups per molecule, and wherein the ratio between the polyisocyanate compound and the polyhydroxy compound corresponds to an NCO/OH ratio of 0.8 – 3.0, said polyadducts having a molecular weight of approximately 100 – 10,000, afterwhich the mixture is given the form desired and is hardened by means of a polyurethane catalyst.

2. Method according to claim 1 wherein said hydroxy compound catalyzation initiator consists of resorcinol, pyrogallol, dihydroxydiphenyl propane or p-xylene glycol.

3. The method of claim 2 wherein said hydroxy compound initiator is dihydroxydiphenylpropane.

* * * * *